United States Patent
Chuang

(10) Patent No.: US 10,720,870 B1
(45) Date of Patent: Jul. 21, 2020

(54) SPEED CONTROL SYSTEM OF A UNIVERSAL MOTOR

(71) Applicant: Bor-Yann Chuang, Taichung (TW)

(72) Inventor: Bor-Yann Chuang, Taichung (TW)

( * ) Notice: Subject to any disclaimer, the term of this patent is extended or adjusted under 35 U.S.C. 154(b) by 10 days.

(21) Appl. No.: 16/364,028

(22) Filed: Mar. 25, 2019

(51) Int. Cl.
| | |
|---|---|
| H02P 25/14 | (2006.01) |
| H02P 23/24 | (2016.01) |
| H02P 3/22 | (2006.01) |
| H02P 23/00 | (2016.01) |
| H02P 23/22 | (2016.01) |

(52) U.S. Cl.
CPC .............. *H02P 25/145* (2013.01); *H02P 3/22* (2013.01); *H02P 23/0077* (2013.01); *H02P 23/22* (2016.02); *H02P 2205/07* (2013.01)

(58) Field of Classification Search
CPC ..... H02P 25/145; H02P 23/22; H02P 2205/07
See application file for complete search history.

(56) References Cited

U.S. PATENT DOCUMENTS

2013/0063061 A1* 3/2013 Hanada ................. H02P 25/024
318/400.14

* cited by examiner

*Primary Examiner* — Cortez M Cook
(74) *Attorney, Agent, or Firm* — Sinorica, LLC

(57) ABSTRACT

A speed control system of a universal motor is electrically connected with a universal motor and includes a speed detecting unit and a controller. The controller is provided with a slow start unit, a speed control unit and a stopping-protecting unit. The slow start unit enables the rotating speed of the universal motor to increase smoothly, and the speed control unit controls and compensates the rotating speed of the universal motor in a way of closed loop, able to achieve effect of stepless speed adjustment and, when used at low speed, having cutting ability similar to that when operated at high speed. The stopping-protecting unit is able to automatically cut off power and carry out protection when machine table is stopped.

6 Claims, 6 Drawing Sheets

SPEED CONTROL SYSTEM OF A UNIVERSAL MOTOR

BACKGROUND OF THE INVENTION

1. Field of the Invention

This invention relates to a speed control system, particularly to a speed control system of a universal motor.

2. Description of the Prior Art

Generally, the rotor and the stator of a conventional universal motor are wound around the armature, and when operated, the conventional universal motor can carry out automatic commutation via a carbon brush and a commutator connected together. Only input general household AC power source, can the universal motor be operated. The conventional universal motor is widely used for hand tools and for small household tools because it is cheap in price and easy in control. For reducing the volume of a motor, the motor sold on the market, which can be operated at high speed, is to be used along with a reduction gear box. When operated at high speed, such a universal motor will produce huge noise and the rotating speed of the motor is apt to change due to voltage floating. Further, the conventional universal motor is only provided with a simple speed adjustment device and impossible to attain constant speed control, and the control mode of the conventional universal motor is to restrict the conduction angle of the AC voltage and thus, when operated at low speed, the torque of the motor will be reduced, improper to be used at highly loaded environment. The universal motor will produce huge starting current and the motor body will vibrate violently at the moment of starting, thus affecting service life and stability of the machine. Therefore, having observed foresaid drawbacks, the inventor of this invention thinks that the conventional universal motor is necessary to be ameliorated and hence devises this invention.

SUMMARY OF THE INVENTION

The objective of this invention is to offer a speed control system of a universal motor, able to make the rotating speed of the universal motor increase smoothly when the universal motor is started and able to correct speed difference automatically, having stability of stepless speed adjustment and, when operated at low speed, having cutting ability similar to that when operated at high speed.

The speed control system of a universal motor in the present invention is electrically connected with a universal motor and includes a speed detecting unit provided in the universal motor, and a controller electrically connected with both the universal motor and the speed detecting unit. The controller is provided with a slow start unit, a speed control unit and a stopping-protecting unit. The slow start unit is formed with a start flag initial module and a start flag clearing module. The start flag initial module is formed with a start flag and an independent acceleration weight. The speed control unit is provided with a rotating speed command input module, a computing module and a compensation module. The stopping-protecting unit is electrically connected with the speed detecting unit.

In use of the speed control system of a universal motor of this invention, when the universal motor is started, the start flag initial module will have the start flag and the acceleration weight initialized. The acceleration weight is an independent acceleration numerical value able to make the rotating speed of the universal motor increase smoothly. When the speed of the universal motor increases up to a set reference value, the start flag clearing module will clear the start flag and cut off the slow start unit to enter the speed adjustment flow process of the speed control unit and make use of the rotating speed command input module to give a rotating speed command for controlling the operating speed of the universal motor. The computing module calculates the actual rotating speed of the universal motor according to the feedback signal frequency of the speed detecting unit and calculates a speed difference by having the actual rotating speed subtracting the speed command for judging the correction needed for the conduction angle. The compensation module compensates the conduction angle according to the correction numerical value for attaining effect of speed adjustment. After the universal motor is operated and when the stopping-protecting unit calculates that the actual rotating speed of the universal motor is low or stops in accordance with the feedback signal frequency of the speed detecting unit, the stopping-protecting unit will send out a protective signal to cut off the power source via the electromagnetic switch for protection. By so designing, the slow start unit functions to make the rotating speed of the universal motor increases smoothly for improving the state of violent vibration when the machine is started and then the speed control unit functions to correct speed difference automatically, thus having stability of stepless speed regulation and, when used at low speed, having similar cutting ability similar to that when used at high speed.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
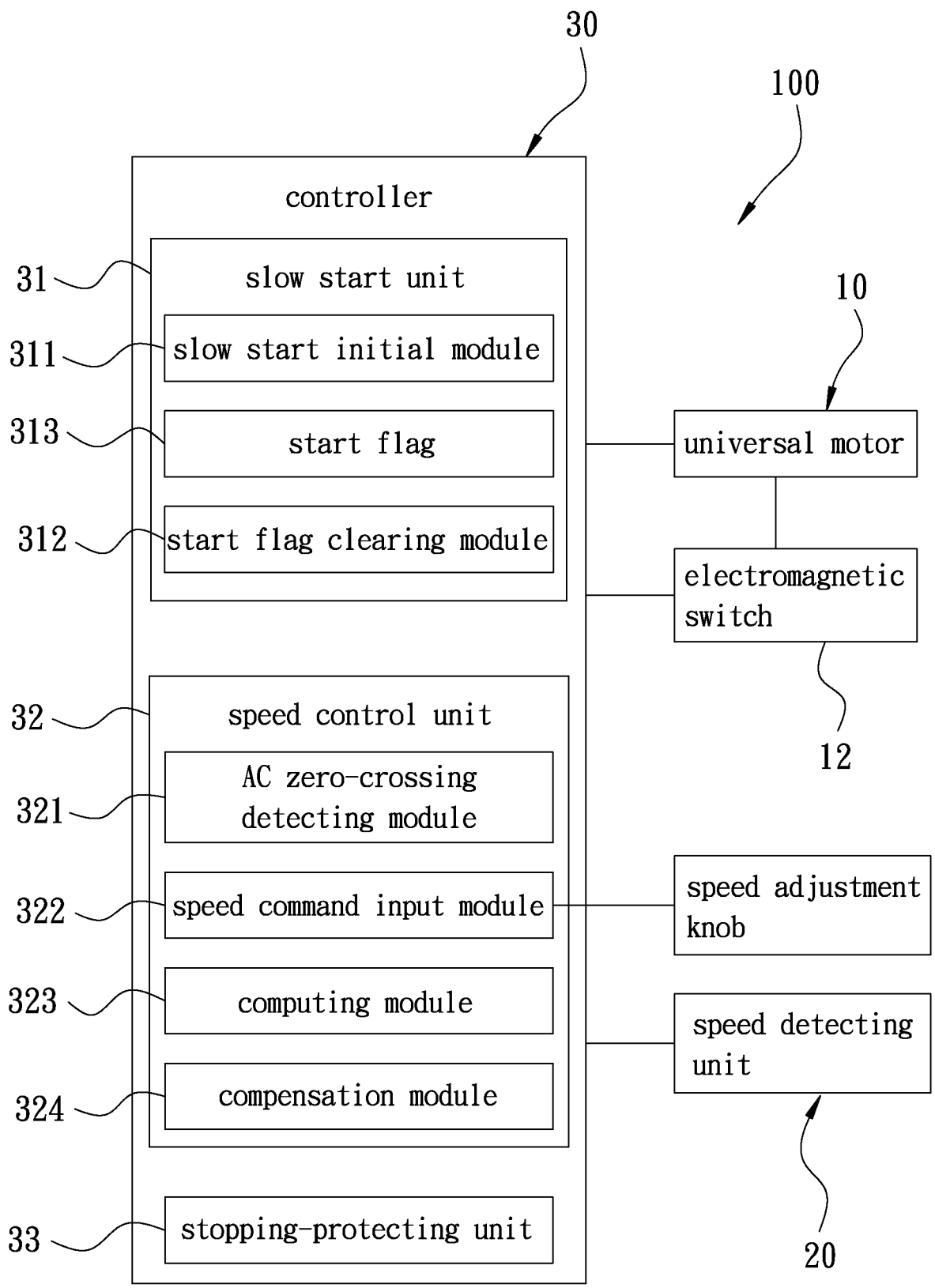
FIG. 1 is a system block diagram of a speed control system of a universal motor in the present invention.
Figure 2:
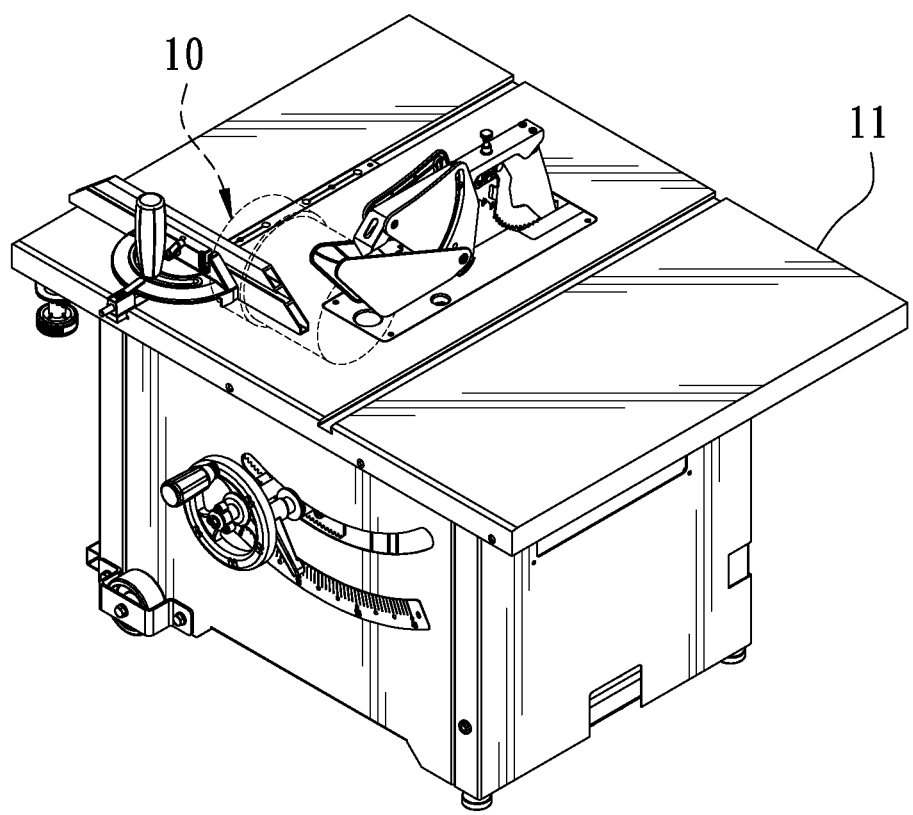
FIG. 2 is a perspective view of a machine table for the universal motor provided with the speed control system in the present invention.
Figure 3:
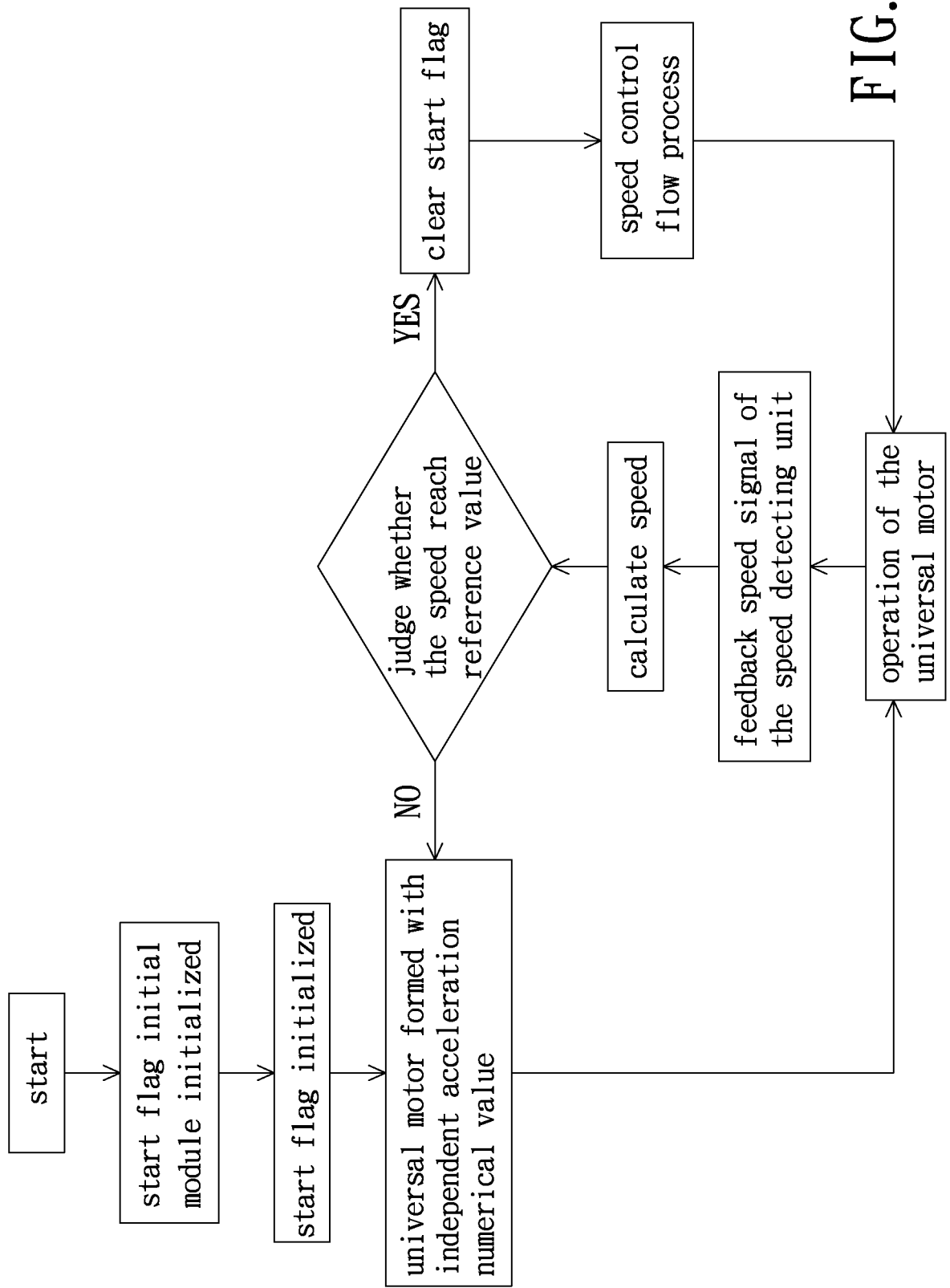
FIG. 3 is a flow chart of the steps of slow start of the universal motor in the present invention.

A preferred embodiment of a speed control system 100 of a universal motor 10 in the present invention, as shown in FIGS. 1, 2 and 3, is to have the speed control system 100 electrically connected with the universal motor 10 able to be installed at a machine table 11, which is electrically connected with a power source by an electromagnetic switch 12. The speed control system 100 of the universal motor 10 includes a speed detecting unit 20 and a controller 30 as main components combined together.

The speed detecting unit 20 is provided in the universal motor 10, and the speed detecting unit 20 is a Hall element.

The controller 30 electrically connected with both the universal motor 10 and the speed detecting unit 20, consists of a slow start unit 31, a speed control unit 32 and a stopping-protecting unit 33.

The slow start unit 31 contains a start flag initial module 311 and a start flag clearing module 312. The start flag initial module 311 is formed with a start flag 313 and an independent acceleration weight. Referring to FIG. 3, when the universal motor 10 is started, the start flag initial module 311 will have the start flag 313 and the acceleration weight initialized. The acceleration weight is an independent acceleration numerical value enabling the rotating speed of the universal motor 10 to increase smoothly. When the rotating speed of the universal motor 10 rises up to a set reference value, the start flag clearing module 312 will clear away the start flag 313 and cut off the slow start unit 31 and then enter the speed adjustment flow process of the speed control unit 32.

Figure 4:
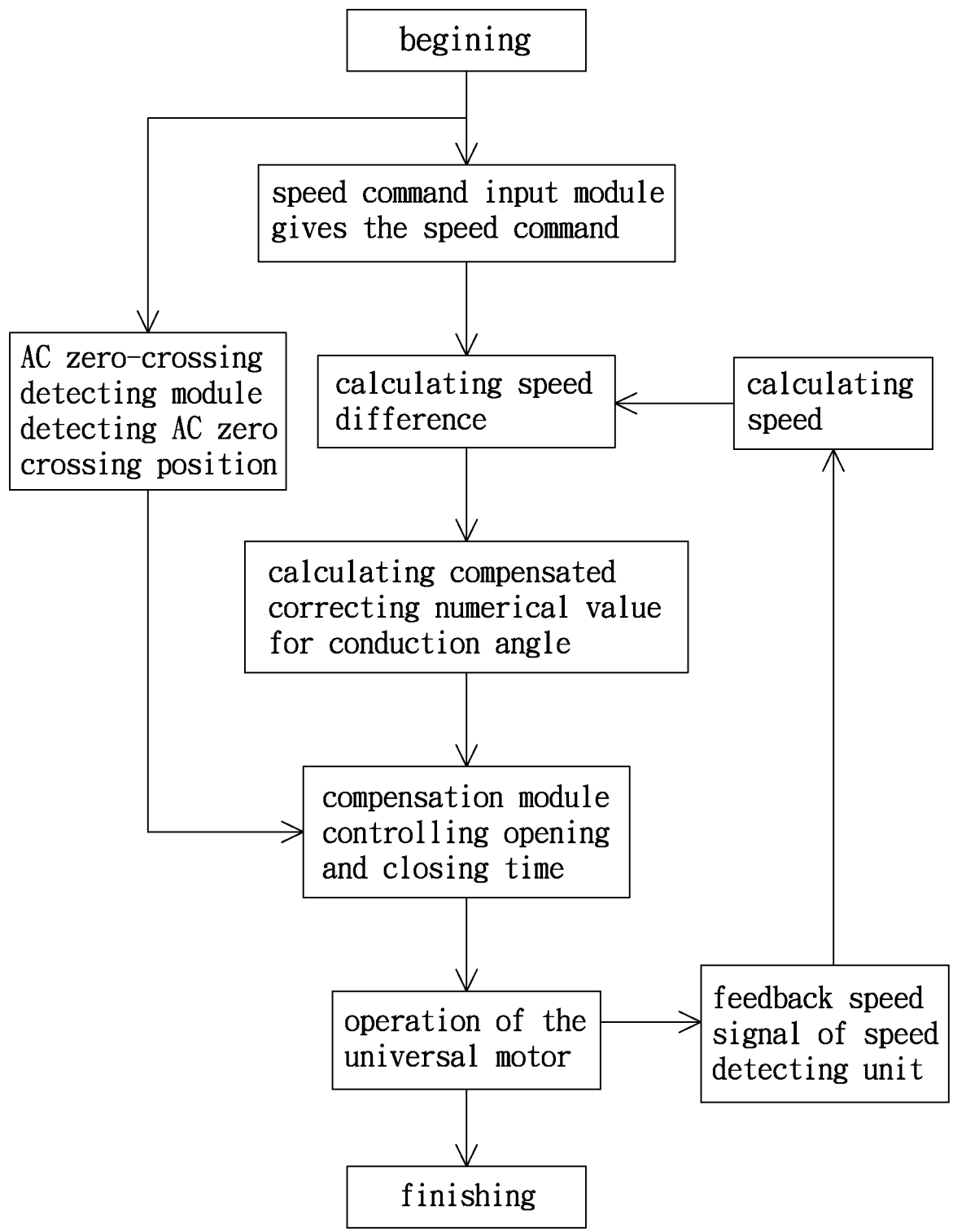
FIG. 4 is a flow chart of the steps of speed control of the universal motor in the present invention.
Figure 6:
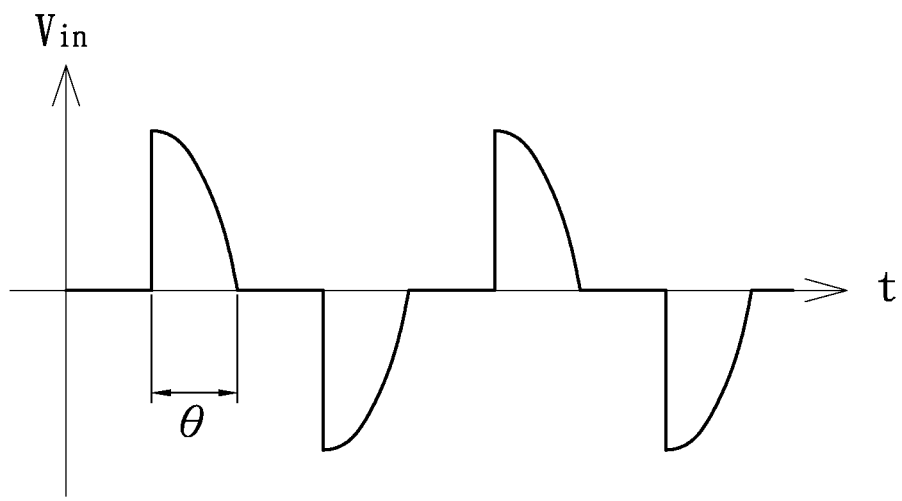
FIG. 6 is a schematic view showing that a compensation module controls opening and closing time in the present invention.
Figure 7:
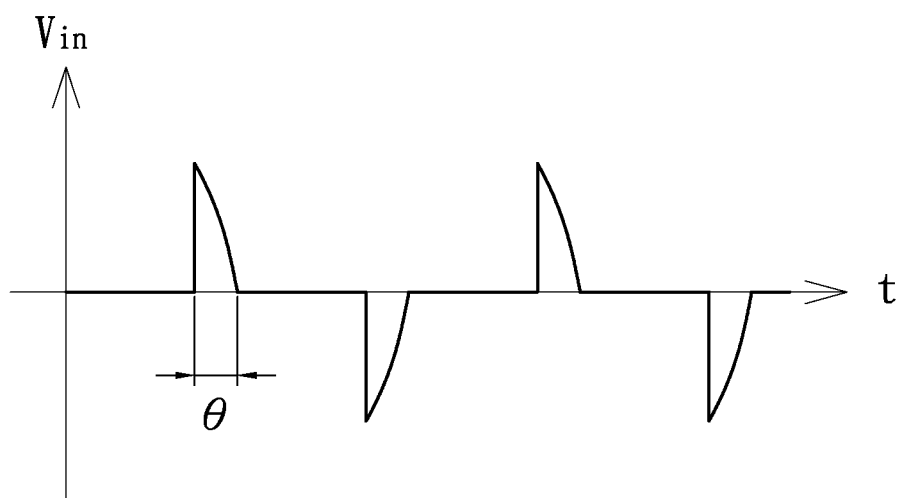
FIG. 7 is a schematic view showing that the compensation module controls the opening and closing time in the present invention.

The speed control unit 32 is electrically connected with an AC zero-crossing detection module 321, a rotating speed command input module 322, a computing module 323 and a compensation module 324. Referring to FIG. 4, the AC zero-crossing detection module 321 is to use hardware circuit for detecting the position (P) of the AC zero-crossing point. In this preferred embodiment, referring to FIG. 5, resistance and zener diode are used to make a circuit to convert an AC sine-wave voltage signal into a synchronous DC square-wave digital signal, thus able to offer the position (P) of the AC zero-crossing point for the speed control unit 32 to use as a reference point of speed control. The rotating speed command input module 322 is to use variable resistance to give a rotating speed command by analog signals, for instance, using a speed adjusting knob to control the operating speed of the universal motor 10. The computing module 323 is to calculate the actual rotating speed of the universal motor 10 according to the feedback signal frequency of the speed detecting unit 20 and calculate a speed difference by having the actual rotating speed subtracting the speed command and then calculate rotating speed compensation via the speed difference. In this preferred embodiment, when the actual rotating speed is larger the rotating speed command, bring the rotating speed difference into the following equation to calculate the 9 value of the conduction angle, which needs to be compensated, and the cut-off time (delay value) needed for maintaining the rotating speed. In the following equation, $K_p$ is proportional value added; $K_i$ is integration gain; e is rotating speed difference; t is time and τ is integral variable. The compensation module 324 is to have conduction angle, which needs to be compensated, and the cut-off time controlling opening and closing time by making use of TRIAC (bi-directional thyristor) to cut off a part of the integral waveform of the sine wave of AC voltage. FIGS. 6 and 7 show that the computing module 323 calculates the conduction angle and the cut-off time needed for maintaining the rotating speed of the universal motor 10 along with the speed feedback signal detected for carrying out adjustment and correction to the cut-off time, and this is speed compensation. Thus, the integral voltage supplied for the motor will drop to attain an effect of speed reduction for carry out controlling. When the actual rotating speed is less than the rotating speed command, the compensation module 324 is able to increase the operating speed of the universal motor 10 for tallying with the rotating speed command. Thus, the speed control system of this invention is able to carry out adjustment and correction to the cut-off time in a way of closed loop speed control and along with the speed feedback signal detected, and this is rotating speed compensation, able to attain effect of speed adjustment.

The equation: $u(t)=K_p e(t)+K_i\int_o^t e(\tau)d\tau$

The stopping-protecting unit 33 is electrically connected with the speed detecting unit 20 and the electromagnetic switch 12. When the stopping-protecting unit 33 calculates that the actual rotating speed of the universal motor 10 is low or stops according to the feedback signal frequency of the speed detecting unit 20, the stopping-protecting unit 33 will send out a protection signal to cut off the power source 13 via the electromagnetic switch 12 for attaining effect of protection.

Referring to FIGS. 2 and 3, in this preferred embodiment, the machine table 11 is a circular sawing machine, and the universal motor 10 is an AC brushed motor. When the machine table 11 is started, the start flag initial module 311 will have the start flag 313 and the acceleration weight initialized. The acceleration weight is an independent acceleration numerical value enabling the rotating speed of the universal motor 10 to increase smoothly. The speed detecting unit 20 calculates the actual rotating speed of the universal motor 10 in accordance with the feedback signal frequency of the speed detecting unit 20, and the start flag initial module 311 judges whether the actual rotating speed of the universal motor 10 reaches the reference value. If the actual rotating speed of the universal motor 10 does not yet reach the reference value, the start flag initial module 311 will maintain the start flag 313 and continuously increase the rotating speed of the universal motor 10 by the acceleration weight. When the rotating speed of the universal motor 10 rises up to a set reference value, the start flag clearing module 312 will clear the start flag 313 and cut off the slow start unit 31 for entering a speed control flow process of the speed control unit 32. When this invention is actually used, the peak current measured is reduced to 28 A, but when the slow start unit 31 is not yet installed, the peak current is 83 A, so the starting current is reduced by about two-thirds, able to improve the state of violent vibration of the machine table.

Figure 5:
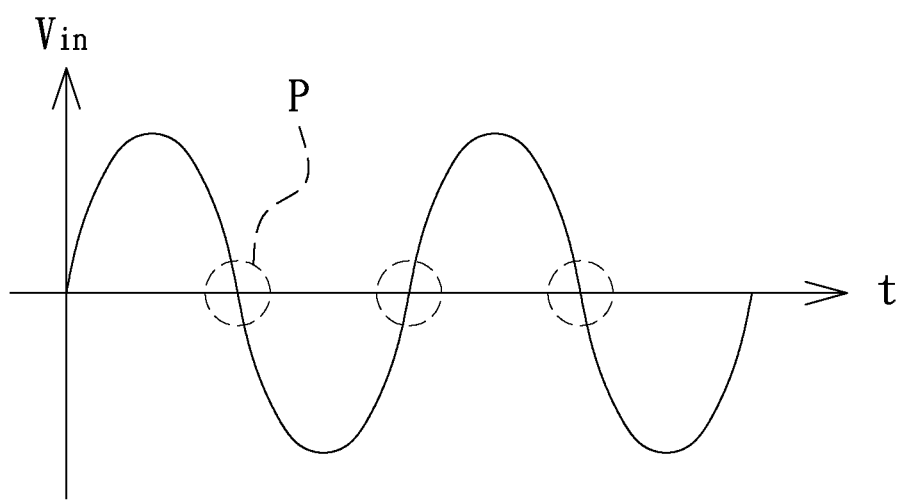
FIG. 5 is a schematic view showing detection of AC zero-crossing position in the present invention.

Referring to FIGS. 4 and 5, the flow process of speed control is first to have the speed control unit 32 making use of the AC zero-crossing detecting module 321 to detect the position (P) of AC zero-crossing point by hardware circuit to serve as a reference point of speed control. Then, the speed command module input module 322 can be operated to give the rotating speed command, and the computing input module 323 will calculate the actual rotating speed of the universal motor 10 according to the feedback signal of the speed detecting unit 32 and have the actual rotating speed subtracting the speed command to calculate the speed difference and thus, the equation u (t) can be used to calculate the correction numerical value needed for compensating the conduction angle and the cut-off time and finally, the compensation module 324 is used to control opening and closing time for attaining effect of speed adjustment. By so designing, the speed control system of a universal motor of this invention adopts closed loop speed control and hence is able to correct speed difference automatically, and speed error can maintain within 50 rpm, able to achieve effect of stability of stepless speed regulation within 2000 rpm to 4000 rpm. Moreover, when this invention is used at low speed, for instance after a saw blade lowers speed due to contract load, the compensation module 324 is able to enhance the torsion for increasing cutting ability, which is similar to the cutting ability when operated at high speed. Thus, when the saw blade is operated at low speed, the noise is low, the power can be saved and the cutting ability is similar to that when operated at high speed. Further, under the condition of low speed, the saw blade can be replaced with a grinding wheel to be used for grinding, attaining universal property of a machine with dual purpose.

In the operating process of the machine table 10, this invention can use wood to stop the saw blade for actually testing the stopping-protecting unit 33. After the machine table 11 is tested to be abnormal, the stopping-protecting unit 33 will send out the protecting signal for making use of the electromagnetic switch 12 to automatically carry out interruption of power supply for protection, and after the abnormal state is eliminated, a user can manually turn on the power source of the machine table 11 to enable the machine table 11 to be operated normally, thus increasing safety and prolonging service life.

While the preferred embodiment of the invention has been described above, it will be recognized and understood that various modifications may be made therein and the appended claims are intended to cover all such modifications that may fall within the spirit and scope of the invention.

What is claimed is:

1. A speed control system of a universal motor being electrically connected with a universal motor and comprising:
   a speed detecting unit provided in said universal motor; and
   a controller electrically connected with both said universal motor and said speed detecting unit, said controller have formed with a slow start unit, a speed control unit and a stopping-protecting unit, said slow start unit comprising a start flag initial module and a start flag clearing module, said start flag initial module comprising a start flag and an independent acceleration weight, said start flag clearing module clearing said start flag when the rotating speed of said universal motor rises up to a set reference value, said speed control unit provided with a rotating speed command input module, a computing module and a compensation module, said computing module calculating actual rotating speed of said universal motor according to feedback signal frequency of said speed detecting unit, said computing module further calculating speed difference by having the actual rotating speed subtracting said rotating speed command for judging correction needed by a conduction angle, said compensation module compensating a numerical value of correction, said stopping-protecting unit electrically connected with both said speed detecting unit and said electromagnetic switch, said stopping-protecting unit calculating that the actual rotating speed of said universal motor is low or stops in accordance with feedback signal frequency of said speed detecting unit, said stopping-protecting unit sending out a protection signal for cutting off the power source of said universal motor via said electromagnetic switch.

2. The speed control system of a universal motor as claimed in claim 1, wherein said speed control unit provided with an AC zero-crossing detecting module, said AC zero-crossing detecting module detecting a position of AC zero-crossing point to serve as a reference point of speed control.

3. The speed control system of a universal motor as claimed in claim 1, wherein said computing module having the speed difference bringing into equation $$u(t) = K_p\, e(t) + K_i^t \int_o^t e(\tau)\, d\tau,$$

wherein $K_p$ being proportional value added, $K_t$ being integration gain, e being speed difference, t being time and $\tau$ being integral variable, said equation functioning to calculate a numerical value of the conduction angle needed to compensate and judge correction needed for said conduction angle.

4. The speed control system of a universal motor as claimed in claim 3, wherein said compensation module making use of TRIAC (bi-directional thyristor) to have the numerical value for compensating said conduction angle control opening and closing time.

5. The speed control system of a universal motor as claimed in claim 1, wherein said speed control unit is closed loop speed control.

6. The speed control system of a universal motor as claimed in claim 1, wherein said speed detecting unit is Hall element.

* * * * *